United States Patent
Jayet et al.

(10) Patent No.: US 9,047,457 B2
(45) Date of Patent: Jun. 2, 2015

(54) PORTABLE ELECTRONIC ENTITY, HOST STATION AND ASSOCIATED METHOD

(75) Inventors: Stephane Jayet, Meyzieu (FR); Olivier Leduc, Caluire et Cuire (FR); Didier Moyart, Lyon (FR)

(73) Assignee: OBERTHUR TECHNOLOGIES, Paris (FR)

( * ) Notice: Subject to any disclaimer, the term of this patent is extended or adjusted under 35 U.S.C. 154(b) by 1546 days.

(21) Appl. No.: 12/026,719

(22) Filed: Feb. 6, 2008

(65) Prior Publication Data

US 2008/0301764 A1 Dec. 4, 2008

(30) Foreign Application Priority Data

May 31, 2007 (FR) ...................... 07 55389

(51) Int. Cl.
| | |
|---|---|
| G06F 7/04 | (2006.01) |
| G06F 17/30 | (2006.01) |
| G06F 15/16 | (2006.01) |
| H04L 29/06 | (2006.01) |
| G06F 12/00 | (2006.01) |
| G06F 21/34 | (2013.01) |
| H04L 9/32 | (2006.01) |
| G06Q 20/34 | (2012.01) |
| G06Q 20/10 | (2012.01) |

(52) U.S. Cl.
CPC .............. *G06F 21/34* (2013.01); *H04L 9/3234* (2013.01); *G06Q 20/341* (2013.01); *G06Q 20/10* (2013.01); *G06Q 20/3574* (2013.01)

(58) Field of Classification Search
CPC ............. G06Q 20/341; G06Q 20/3674; H04L 9/3234; G06F 21/34

USPC ....................... 726/1, 5, 9; 713/182, 184, 185
See application file for complete search history.

(56) References Cited

U.S. PATENT DOCUMENTS

| | | | |
|---|---|---|---|
| 6,119,131 A * | 9/2000 | Cabrera et al. ....................... 1/1 |
| 6,216,230 B1 * | 4/2001 | Rallis et al. ................... 713/185 |
| 7,168,092 B2 * | 1/2007 | King et al. ........................ 726/9 |
| 7,299,364 B2 * | 11/2007 | Noble et al. .................. 713/189 |
| 7,512,239 B2 * | 3/2009 | Ueno et al. ................... 380/263 |
| 7,676,829 B1 * | 3/2010 | Gui et al. .......................... 726/5 |
| 7,712,131 B1 * | 5/2010 | Lethe ............................. 726/20 |
| 7,739,509 B2 * | 6/2010 | Silverbrook et al. ......... 713/176 |
| 7,743,409 B2 * | 6/2010 | Gonzalez et al. ................. 726/9 |
| 7,748,031 B2 * | 6/2010 | Gonzalez et al. ................. 726/9 |

(Continued)

FOREIGN PATENT DOCUMENTS

DE 3411570 11/1985

OTHER PUBLICATIONS

Search report in corresponding French Application No. 0755389.

*Primary Examiner* — Tae Kim
(74) *Attorney, Agent, or Firm* — Young & Thompson

(57) ABSTRACT

A host station includes: a first electronic component having a "first" identifier, conforming to a predetermined convention, identifiers according to the convention including a "common" part, common to electronic components of the same family, and a "unique" part specific to each instance of an electronic component in the same family, at least one second electronic component having a "second" identifier conforming to the convention, and the common part of the second identifier being different from the common part of the first identifier, and verification of matching in accordance with a predetermined rule of the unique part of the first identifier with the unique part of the second identifier.

45 Claims, 2 Drawing Sheets

(56) References Cited

U.S. PATENT DOCUMENTS

| | | | |
|---|---|---|---|
| 2003/0231329 A1* | 12/2003 | Edmonds et al. | 358/1.13 |
| 2003/0236975 A1* | 12/2003 | Birk et al. | 713/156 |
| 2004/0052244 A1* | 3/2004 | Vitikka | 370/352 |
| 2005/0154894 A1* | 7/2005 | Freudenschuss | 713/182 |
| 2006/0242687 A1* | 10/2006 | Thione et al. | 726/4 |
| 2007/0006290 A1* | 1/2007 | Li | 726/9 |
| 2007/0016941 A1* | 1/2007 | Gonzalez et al. | 726/9 |
| 2007/0094721 A1* | 4/2007 | Nguyen et al. | 726/9 |
| 2007/0101152 A1* | 5/2007 | Mercredi et al. | 713/185 |
| 2008/0098470 A1* | 4/2008 | Danre | 726/9 |
| 2008/0201764 A1* | 8/2008 | Lu et al. | 726/2 |
| 2008/0301433 A1* | 12/2008 | Vito | 713/153 |
| 2010/0029247 A1* | 2/2010 | De Atley et al. | 455/411 |

\* cited by examiner

PORTABLE ELECTRONIC ENTITY, HOST STATION AND ASSOCIATED METHOD

The present invention concerns a portable electronic entity and a host station, as well as an associated method.

The host station can be a portable or fixed personal computer, a workstation connected to a server, a mainframe computer, a pocket computer or any other electronic device capable of executing operations.

The portable (or removable) electronic entity can be an electronic key. It can also be a microcircuit card or an RFID label.

The portable electronic entity includes one or more electronic components. Those electronic components can be, for example, a non-volatile memory and a microcircuit card reader system, where applicable comprising a microcircuit card, that card being removable or installed permanently.

The portable electronic entity can also include an electronic circuit that can be an integrated circuit, including a microprocessor, for example. The electronic circuit can be a microcontroller including a microprocessor, memories and communication peripherals, and where applicable controlling the memory described hereinabove.

It is common practice for electronic components to have identifiers. These are often given by manufacturers to their components. They can be hexadecimal or binary strings or other types of information.

An identifier of this kind often includes a "common portion" that is identical for all the electronic components of the same design and a "unique portion", specific to one physical instance of the given component within the family of components of the same design.

Note that the family concept can vary as a function of the electronic component manufacturer; for example, for some manufacturers identical microcontrollers form part of the same family only if the content of their read-only memory is identical, although other manufacturers may deem this condition not to be indispensable. The same remark also applies to memory controllers if a read-only memory is attached to each memory controller.

Moreover, electronic components have functions. In numerous situations, one function of a first electronic component is complementary, from the point of view of the host station (including human or hardware users of the host station), to a function of a second electronic component.

The complementarity can, for example, reside in the fact that the unavailability, for example the absence, of the function of the second electronic component (respectively the first component) means that the function of the first electronic component (or respectively the second electronic component) is inoperative, at least partially, for example without effect.

For example, the function of a first component can be to make available to the host station sensitive data contained in the first component and the function of a second component complementing the function of the first component from the point of view of the host station can be making available to the host station sensitive data contained in the second component and complementary from the point of view of the host station to the sensitive data contained in the first electronic component.

Another example relates to a first component including means for decrypting data stored in a second component. An application executed by the host station reads the data stored in the second component and sends it to the first component, which decrypts it and sends it back to the host station.

Other electronic component functions can naturally be envisaged.

The present invention addresses the problem that arises in a situation where at least two electronic components are in communication with a host station and the first electronic component includes a function that is complementary, from the point of view of the host station, to the function of a second of the electronic components.

In a situation of this kind, it would be advantageous for the host station to be able to recognize, automatically or autonomously, which component is complementary to the other, for example in order to execute an application using the complementary functions only if the two components are present.

For the moment there is no solution enabling the host station to connect automatically or autonomously the two components having complementary functions so that those functions can therefore be used.

Note that the problem arises in particular when the two electronic components are in the same portable electronic entity.

This problem is encountered in particular in contexts where it is desirable, or even imperative, for the host station to be able to check, on behalf of its user, that a component has not been illegitimately replaced by another within the same portable electronic entity.

To solve the above problem in various contexts, in accordance with a first definition of the invention, the present invention proposes a host station including:

means for communication with a first electronic component, said first electronic component having a "first" identifier, said first identifier conforming to a predetermined convention, identifiers according to said convention comprising a "common" part, common to electronic components of the same family, and a "unique" part specific to each instance of an electronic component in the same family, means for communication with at least one second electronic component, said second electronic component having a "second" identifier, said second identifier conforming to said convention, and the common part of said second identifier being different from the common part of said first identifier, characterized in that said host station further includes means for verification of matching in accordance with a predetermined rule of the unique part of said first identifier with the unique part of said second identifier.

This host station offers the advantage that verification of matching in accordance with a predetermined rule provides information indicating whether matching was achieved or not, on which information the execution of an application or communication with a user or with a computer external to the host station can thereafter depend.

If the communication means and the identifiers conform to the USB standard, serving as predetermined convention, an identifier includes the following fields: vendor identifier (VID, common to all electronic components manufactured by the same manufacturer or sold by the same vendor), product identifier (PID, common to all electronic components of the same design), serial number (SN) and Product Description String.

According to one particular convention, the common portion of the identifier is the concatenation of the VID, the PID and the Product Description String, the unique portion of the identifier being the SN.

According to another particular convention, the common portion of the identifier is the concatenation of the VID and the PID only, and the unique portion of the identifier is the concatenation of the Product Description String and the SN.

According to a third particular convention, the common portion of the identifier is the concatenation of the VID and PID, while the unique portion is the SN, the Product Description String not being operative at this level.

In this regard, with certain operating systems two USB keys cannot function if their vendor identifiers, product identifiers and serial numbers are identical.

Matching in accordance with said predetermined rule is preferably achieved if a predetermined arithmetic equality between a portion of said unique part of the first identifier and the portion of said unique part of said second identifier is achieved.

Said portion preferably comprises a serial number conforming to the USB standard. In this case, the predetermined convention conforms to the USB standard.

In a preferred embodiment said arithmetic equality is identity.

According to an advantageous feature, said verification means comprise a "verification" application adapted to determine said first identifier.

Said verification application is preferably adapted to compare:
an identifier assigned to a logical volume corresponding to said first electronic component,
with each identifier assigned to the logical volumes corresponding to the electronic components communicating with said host station via communication means conforming to a predetermined standard,
so as to determine said first identifier.

In one embodiment: said identifier assigned to a logical volume corresponding to said first electronic component is obtained using the Windows™ API command GetVolumeNameForVolumeMountPoint, and each identifier assigned to the logical volumes corresponding to the electronic components communicating with said host station via communication means conforming to a predetermined standard is obtained using at least the Windows™ API commands SetupDiEnumDeviceInfo and GetVolumeNameForVolumeMountPoint.

The host station is preferably characterized in that it further includes means for effecting a search of a plurality of electronic components each having an identifier conforming to said convention and the common part whereof is different from that of said first identifier for an electronic component the unique part of the identifier whereof is matched with the unique part of said first identifier.

This feature identifies or locates an electronic component for which a match is effected from a plurality of components in communication with the host station.

The host station is preferably characterized in that it further includes means for executing a "dependent" application and means for submitting execution of at least a portion of said application to said verification of said matching.

This enables the information relating to matching to be used in such a manner that it determines the progress of the execution of an application.

The host station is preferably characterized in that said dependent application is adapted to use a "first" function of said first component and a "second" function of said second component.

This enables the information relating to matching to be used in such a manner that the application uses the functions of the two components only if they are matched.

The host station can preferably be characterized in that said dependent application comprises an identity verification program, the function of the first component comprising making available to said application a first set of biometric or personal data and the function of the second component comprising making available to said application a second set of biometric or personal data.

Alternatively, said application comprises a network browser and the function of said first component comprises making said personal data application available and the function of said second component comprises making a cryptographic key available to said application.

Alternatively, the connections of the portable entities to a host station can be effected by communication means conforming to the ISO 7816 standard or to the 14443 standard or to any other standard known to the person skilled in the art.

In one particular embodiment, the operating system of said host station is a version of Windows™.

The operating system can be a version of Windows Vista™, Windows XP™, Windows NT™, or alternatively a version of Mac OS™, Unix, Linux, or a mainframe system.

According to a second definition of the invention, it proposes a portable electronic entity comprising:
a first electronic component having a "first" identifier, said first identifier conforming to a predetermined convention, identifiers according to said convention comprising a "common" part, common to electronic components of the same family, and a "unique" part specific to each instance of an electronic component in the same family,
a second electronic component having a "second" identifier, said second identifier conforming to said convention, and the common part of said second identifier being different from the common part of said first identifier,
means for communication with a host station,
characterized in that the unique part of said first identifier and the unique part of said second identifier are matched in accordance with a predetermined rule.

This portable electronic entity can be used by the host station referred to hereinabove.

The portable electronic entity preferably further includes means for effecting a verification of matching in accordance with a predetermined rule of the unique portion of said first identifier with the unique portion of said second identifier.

According to a third definition of the invention, close to the second definition of the invention, the latter proposes a portable electronic entity comprising:
a first electronic component having a "first" identifier, said first identifier conforming to a predetermined convention, identifiers according to said convention comprising a "common" part, common to electronic components of the same family, and a "unique" part specific to each instance of an electronic component in the same family,
means for communication with at least one second electronic component having a "second" identifier, said second identifier conforming to said convention, and the common part of said second identifier being different from the common part of said first identifier,
means for communication with a host station,
characterized in that the portable electronic entity further includes means for effecting a verification of matching in accordance with a predetermined rule of the unique part of said first identifier with the unique part of said second identifier.

This portable electronic entity offers the advantage that the verification of matching in accordance with a predetermined rule provides information indicating whether matching, on which the execution of an application or communication with a user or with a computer external to the host station or to the portable electronic entity can subsequently be made dependent.

The portable electronic entities according to the second and third general definitions of the invention can advantageously be characterized as follows:

Matching in accordance with said predetermined rule is preferably achieved when a predetermined arithmetic equality is achieved between a portion of said unique part of the first identifier and the same portion of said unique part of said second identifier.

Said portion preferably comprises a serial number conforming to the USB standard. In this case, the predetermined convention conforms to the USB standard.

Said arithmetic equality is preferably identity.

Said means of communication with a host station preferably conform to the USB standard.

The first electronic component is preferably a combination comprising a memory controller and a non-volatile memory attached to said memory controller.

Different types of non-volatile memory exist and can be used singly or in combination. Examples are non-rewritable memory (ROM), rewritable memory (NVRAM, for example of EEPROM or Flash RAM type).

In the context of the third general definition of the invention, said second communication means preferably comprise a microcircuit card reader.

A reader of this kind can also be present in the portable electronic entity according to the second definition of the invention, in particular if one of the components of that portable electronic entity is a microcircuit card. More generally, means of communication with the electronic components can be present in the portable electronic entity according to the second definition.

Alternatively, the second electronic component is mounted on the same printed circuit as the first component.

A microcircuit card is preferably inserted in said microcircuit card reader and said microcircuit card is preferably personalized with an identifier, for example the second identifier.

In the context of the second and third definitions of the invention, according to an advantageous feature, said means for effecting a verification of matching comprise a "verification" application adapted to be executed by the host station.

Said verification application is preferably launched automatically after connection of the portable electronic entity to the host station.

According to one embodiment, said first electronic component comprising a memory storing the instructions of said verification application, said verification application is adapted to determine said first identifier.

Said verification application is preferably adapted to compare an identifier assigned to a logical volume corresponding to the peripheral storing said application with each identifier assigned to the logical volumes corresponding to the electronic components communicating with said host station via communication means conforming to a predetermined standard, so as to determine said first identifier.

For example, said identifier assigned to a logical volume corresponding to the peripheral storing said application is obtained using the Windows™ API command GetVolumeNameForVolumeMountPoint and each identifier assigned to the logical volumes corresponding to the electronic components communicating with said host station via communication means conforming to a predetermined standard is obtained using at least the Windows™ API commands SetupDiEnumDeviceInfo and GetVolumeNameForVolumeMountPoint.

Said identifier is preferably stored in a file written into a memory area of said microcircuit card.

The portable electronic entity preferably further includes means for effecting a search of a plurality of electronic components communicating with the host station each having an identifier conforming to said convention and the common part of the identifier whereof is different from that of said first identifier for an electronic component the unique part of the identifier whereof is matched with the unique part of said first identifier.

These means for executing a search can be an application adapted to be executed on a host station communicating with the portable electronic entity and can in particular be included in the verification application.

This feature identifies or locates an electronic component for which a match has been achieved from a plurality of components in communication with the host station.

It preferably further includes a memory storing instructions of a dependent application adapted to be at least partly loaded onto a host station and means for submitting the execution of at least a portion of said dependent application to said verification of said matching.

Said first electronic component preferably comprises said memory storing instructions of a dependent application.

For simplicity, the dependent application and the verification application can be combined, one portion of the application providing the search function and/or verification function, one portion being dependent on the result of the verification.

Said application is preferably adapted to use a "first" function of said first component and a "second" function of said second component.

In a preferred embodiment, said application comprises a network browser and the function of said first component comprises making personal data available to said application and the function of said second component comprises making a cryptographic key available to said application.

For example, said browser is adapted to the Internet network, or said browser is adapted to a mobile telecommunications network.

Said navigator is preferably made secure by the use of the security functions of the microcircuit card. And said network browser preferably authorizes access only to predetermined Internet addresses.

According to a different embodiment, said application comprises an identity verification program and the function of the first component comprises making a stored identity photograph available to said application and the function of the second component comprises making said identity text data available to said application.

The portable electronic entity is preferably characterized in that it further includes means for determining the identifier of said first electronic component or of the electronic component that comprises said memory storing instructions of an application.

This enables use of an application the code whereof does not include the identifier of the electronic component but which can determine it during its execution. This achieves economies in terms of production of the portable electronic entity because of the number of production steps, which is therefore reduced.

Said means for effecting a determination of the identifier of said first electronic component preferably comprise means for using at least one function of an operating system of said host station.

The means for communication with the host station can alternatively also conform to the ISO 7816 standard or conform to the MMC (MultiMedia Card) or SD (Secure Digital) card format, for example.

The portable electronic entity can also be a telephone, a personal digital assistant (PDA), or an electronic document, i.e. a paper document with a microcircuit including communication means, for example contactless communication means, within the thickness of one of its pages, such as an electronic passport.

According to a fourth general definition of the invention, the latter proposes a method of verification in a host station with which a first electronic component having a "first" identifier communicates, said first identifier conforming to a predetermined convention, identifiers according to said convention comprising a "common" part common to electronic components of the same family and a "unique" part specific to each instance of an electronic component in the same family, characterized in that the method comprises a step of verification of matching in accordance with a predetermined rule of said unique part of said first identifier with the unique part of a "second" identifier of a second electronic component communicating with said host station, said second identifier conforming to said convention and the common part of said second identifier being different from the common part of said first identifier.

Matching in accordance with said predetermined rule is preferably achieved when a predetermined arithmetic equality between a portion of said unique part of the first identifier and the same portion of said unique part of said second identifier is achieved.

Said portion preferably comprises a serial number conforming to the USB standard. In this case, the predetermined convention conforms to the USB standard.

The method preferably further includes a step of searching a plurality of electronic components communicating with said host station and each having an identifier conforming to said predetermined convention and the common portion whereof is different from that of said first identifier for an electronic component the unique part of the identifier whereof is matched with the unique part of said first identifier.

According to one advantageous feature, the method further comprises a step of comparison:

of an identifier assigned by an operating system of said host station to a logical volume corresponding to said first electronic component, with each identifier assigned by said operating system to a logical volume corresponding to a physical peripheral communicating with said host station on which said application is executed by communication means conforming to the USB standard, so as to determine the identifier of said first electronic component.

The method preferably comprises a step of obtaining the identifier assigned to a logical volume corresponding to the peripheral storing said application using the Windows™ API command GetvolumeNameForVolumeMountPoint and a step of obtaining each identifier assigned to the logical volumes corresponding to the electronic components communicating with said host station via communication means conforming to a predetermined standard using at least the Windows™ API commands SetupDiEnumDeviceInfo and GetVolumeNameForVolumeMountPoint.

The method preferably includes a step of execution of an application and a step of submission of at least a portion of said execution to said verification of said matching.

The method preferably includes a step of determination or storage or obtaining of the identifier of said first electronic component, preferably using at least one function of an operating system of the host station.

The method according to the invention preferably has features similar to those described hereinabove for the host station according to the invention or the portable electronic entity according to the invention, those features being taken individually or in combination.

The method also comprises a step of reading or storage or obtaining an identifier of a microchip card included in said second electronic component, said identifier being written into a file in a memory of the microchip card.

According to a fourth general definition of the invention, the latter proposes a computer program comprising a series of instructions adapted, when they are executed by a microprocessor, to execute a method according to the invention.

Other features and advantages of the invention will become apparent in the light of the following detailed description and the drawings, in which.

A first embodiment of the invention uses a secure browser to access the server of a bank.

Figure 1:
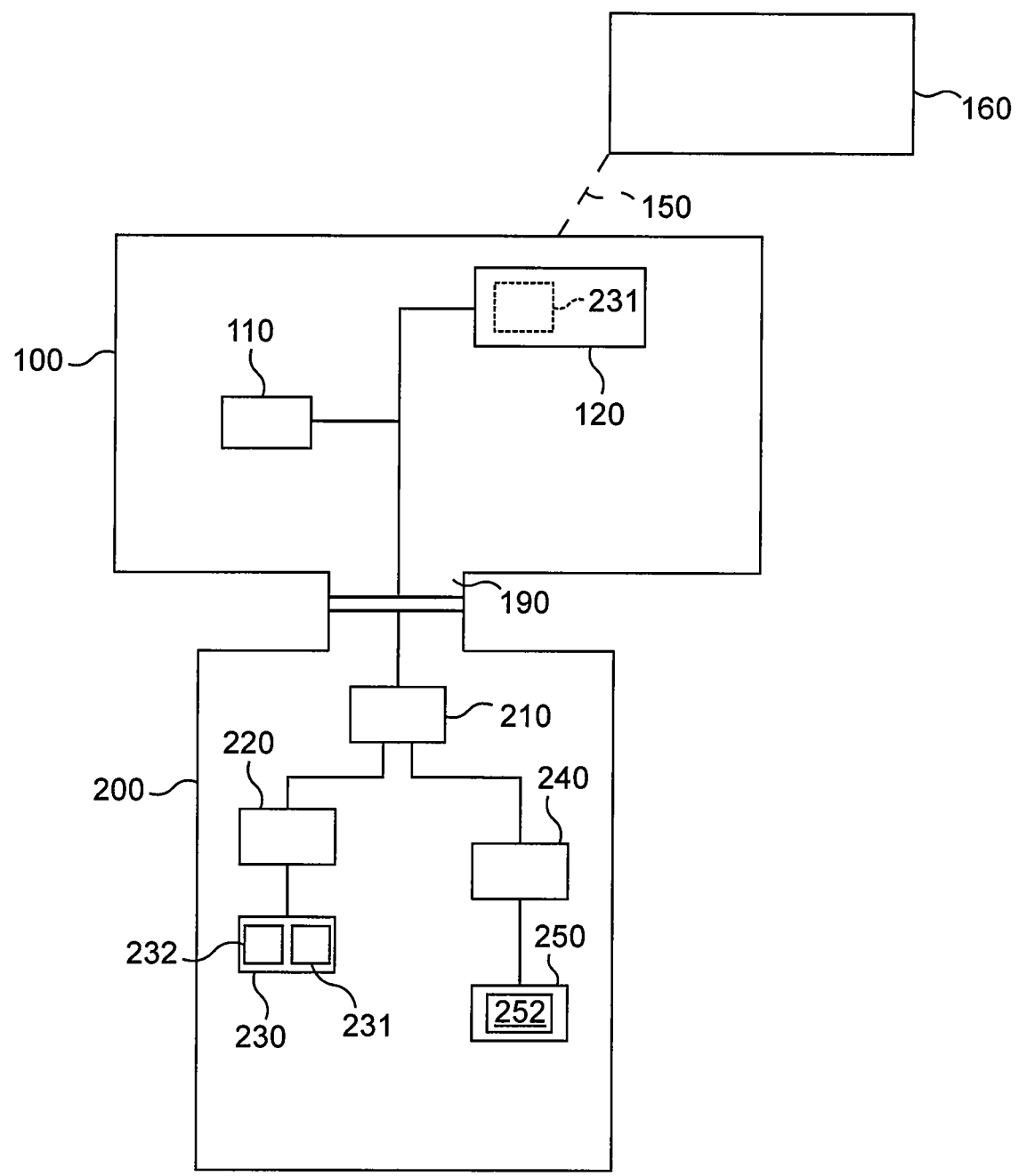
FIG. 1 is a view of one embodiment of a portable electronic entity according to the invention, connected to a host station according to the invention.

Referring to FIG. 1, a host station 100 comprises a processor 110, a memory 120, a first USB connector 190 and a second USB connector (not shown). The host station 100 is a personal computer running an off-the-shelf operating system, in the home of a private person, and is connected to the Internet network 150, which enables it to communicate with the remote server 160 of a bank.

A user connects a USB key 200, i.e. a portable electronic entity having means of communication with a host station conforming to the USB standard, to the connector 190. This key contains the personal banking data of the user, and was supplied to them by their bank.

A second USB key 300 (not shown) is connected to the second connector, either by mistake or because a number of persons are using the host station 100 simultaneously.

The USB key 200 comprises a flash memory controller 220, a flash memory 230 attached to the controller 220, a microcircuit card reader 240 and a microcircuit card 250 inserted into the reader 240.

The flash memory controller 220 and the reader 240 are connected to a concentrator (or hub) 210 of the key 200.

The flash memory controller 220 is a mass storage class device (see for example "USB Mass Storage Class Specification Overview, revision 1.2", USB Implementers Forum, Inc.). Its identifier is VID/PID1/SN1.

The flash memory 230 has received personal data 232 (name, forename, bank account number, personal identifier) specific to the holder of the USB key 200. This data was stored either when the USB key 200 was issued by the bank or subsequently.

The reader 240 is an integrated circuit(s) cards interface device (see for example "Specification for Integrated Circuit(s) Cards Interface Devices" rev. 1.1, USB Implementers Forum, Inc.).

The microcircuit card 250 is an integrated circuit(s) card device (see for example "Specification for USB Integrated Circuit(s) Card Devices Revision 1.0", USB Implementers Forum, Inc.).

In the particular case shown, this card 250 is an ID-000 format SIM card conforming to the ISO 7816 standard. The card 250 is personalized differently for each key. An identifier was given to it during an electrical personalization step, in the course of which a file was created in the memory of the microcircuit card, an identifier being written into the file.

It comes from the same vendor as the controller 220, and its vendor identifier is therefore VID. Its product identifier is that of the microcircuit card family here denoted PID2 and different from PID1. It has been personalized so that its serial number SN1 is the same as that of the controller 220. Its identifier is VID/PID2/SN1.

The microcircuit card reader 240 does not have an identifier.

These elements 220, 230, 240, 250 are compatible with standard USB drivers.

An application 231 is stored in the flash memory 230. It is an Internet browser that can function on the host station 100. This browser was written for the issuing bank, and authorizes access only to authorized Internet address (URL), in this instance corresponding to the servers of the issuing bank. For this purpose, before displaying a page, the browser verifies that the address is authorized, i.e. that it corresponds to the server of the bank. Browser preferences can be stored in the flash memory 230 when it is initialized or subsequently.

The code of the application 231 includes the product identifier PID1 of the controller 220 to which the read-only memory 230 is attached and the identifier PID2 which designates the family of microcircuit cards, as already stated.

Finally, the controller 220 automatically launches the application 231 on the host station 100 by means of an autorun mechanism known to the person skilled in the art.

Consider now the case where the USB key 300 (not shown), sourced from the same manufacturer as the USB key 200, comprises a flash memory controller 320 with identifier VID/PID3/SN2 and a flash memory 330.

The flash memory controller 320 has a product identifier different from the product identifier of the flash memory controller 220 because the content of the read-only memory of the controller 320 differs from the content of the read-only memory of the controller 220. The product identifier PID3 is therefore different from PID1. It is also different from PID2.

Moreover, the flash memory 330 received its identifier after the controller 320 and has the same serial number SN2. It is important that the serial number SN2 is different from the serial number SN1.

The USB key 300 also comprises a microcircuit card reader 340 containing a microcircuit card 350 sourced from the same manufacturer and that has been personalized so that its serial number is the same as that of the controller 220, i.e. SN2. Its identifier is therefore VID/PID2/SN2.

An application 331 is stored in the flash memory 330. The application 331 can be another browser limiting access to the server of a bank, where appropriate identical to the bank issuing the USB key 200.

The application 231, which is stored in the memory 230 of the USB key 200, as already stated, is loaded automatically and is executed by the central unit 110. From this time onwards it communicates with the electronic components 220 and 240 via communication means conforming to the USB standard, using encryption of communications, in a manner known to the person skilled in the art and useful in the device described.

It effects the following steps:

In a first step, the application 231 searches the connected electronic components for those for which the product identifier is equal to PID1. It reads their serial numbers and stores them.

In a second step, the application 231 searches the connected electronic components for those for which the product identifier is equal to PID2.

To do this, the application 231 creates a list of all the microcircuit card readers connected to the host station 100, for example using the method that is part of the Windows™ SCardListReaders API.

Then, for each reader from this list, the application 231 sends a series of APDU format commands requesting the identifier of the card contained in the reader. It receives in return an APDU format response containing that identifier. It compares it to PID2 and retains the microcircuit card reader if that identifier is indeed equal to PID2.

In a third step, the application 231 selects from the components identified in the second step only those for which the serial number is equal to the serial numbers stored in the first step.

In a fourth step the application 231 uses the data made available by the components identified in the third step to effect communication with the remote server 160 via the network.

Thus, in the situation represented, the situation is as follows:

In the first step, the application 231 finds only the controller 220. It then reads the serial number of the controller 220, i.e. SN1, and stores it.

In the second step, the application 231 finds the cards 250 and 350.

In the third step, the application 231 selects from the components 250 and 350 all those for which the serial number is equal to SN1, and so finds only the card 250.

In the fourth step, the application 231 uses conjointly the data made available to it by the microcircuit card 250 and the flash memory 230 to set up a secure connection via the network 150 with the remote server 160.

Exchanges between the browser 231 and the server 400 are encrypted using cryptographic means available in the microcircuit card 250.

The application 231 uses the security functions available in the microcircuit card 250, known to the person skilled in the art and useful in the device described. It uses in particular a cryptographic key, or other cryptographic means, specific to each microcircuit card or each cardholder.

The application 231 makes communication with the server 160 secure with the aid of an identifier and a secret element (for example a cryptographic key) that are different for each key or key holder. The secret element is stored in the card 250, for example, where appropriate with various cryptographic means.

The application 231 uses the personal data 232 (name, forename, bank account number, personal identifier) contained in the flash memory 230 to communicate with the server 160 in a personalized fashion.

Verifying the identity of the serial numbers prevents the application 231 accessing or using data present in the memory 330, which must remain confidential, because it does not belong to the holder of the key 200.

Symmetrically, the application 331 of the second card can use another identifier and another secret element stored in the card 350, and does not access the data present in the memory 260.

The solution proposed here also avoids having to give the controller 220 an identifier specific to each holder, and therefore late on in the process of fabrication of the device. Only the card 250 is personalized, and this personalization is carried out at low cost. This achieves substantial savings.

The data 232 is then stored when the USB key is used after personalization. It may consist of the preferences of the user of the key 200, history data for the connection to the remote server 160 or user account management data.

In an alternative embodiment, the host station 100 can be a portable computer, a personal digital assistant or a mobile telephone communicating with the remote server 160 via a mobile telecommunications network.

In a variant of the first embodiment described, the product identifier PID1 of the controller 220 is not included in the code of the application 231.

Once launched, the application 231 searches for the identifier of the electronic component from which it was launched. It uses functions of the operating system for this.

In a first step, as soon as it is launched, the application 231 obtains the current path in the file system, which is that from which it was launched.

In a second step, the application 231 determines the specific identifier (called the globally unique identifier (guid)) assigned by the operating system to the logical volume (or peripheral) corresponding to the path found in the first step.

In a third step, the application 231 creates the list of all the USB class physical peripherals connected to the station 100.

In the case described hereinabove, it finds the memory controllers 220 and 320 and the microcircuit card readers 240 and 340.

In a fourth step, the application 231 lists all the logical peripherals associated with each physical peripheral found in the third step. It then determines and stores, for each logical peripheral found in this way, the path in the corresponding file system.

In a fifth step, the application 231 determines and stores, for each of the paths in the file system determined during the preceding step, the specific identifier assigned by the operating system to the corresponding logical volume (or peripheral).

In a sixth step, the application 231 compares the specific identifier obtained in the second step with the specific identifiers obtained in the fifth step and thus finds the only physical peripheral with which the specific identifier obtained in the second step is associated.

Finally, the application 231 stores the vendor identifier and the product identifier of the physical peripheral found in this way.

The above steps are carried out by means of commands of the Windows™ application programming interface (API) listed hereinafter:
- 1st step: getCwd
- 2nd step: GetVolumeNameforVolumeMountPoint
- 3rd step: SetupDiGetClassDevs
- 4th step: SetupDiEnumDeviceInfo then SetDiGetDeviceinterfaceDetail
- 5th step: GetVolumeNameForVolumeMountPoint
- 6th step: CM_Get_Device_ID In a second embodiment, the invention detects falsification of an electronic passport including communication means conforming to the USB standard.

Figure 2:
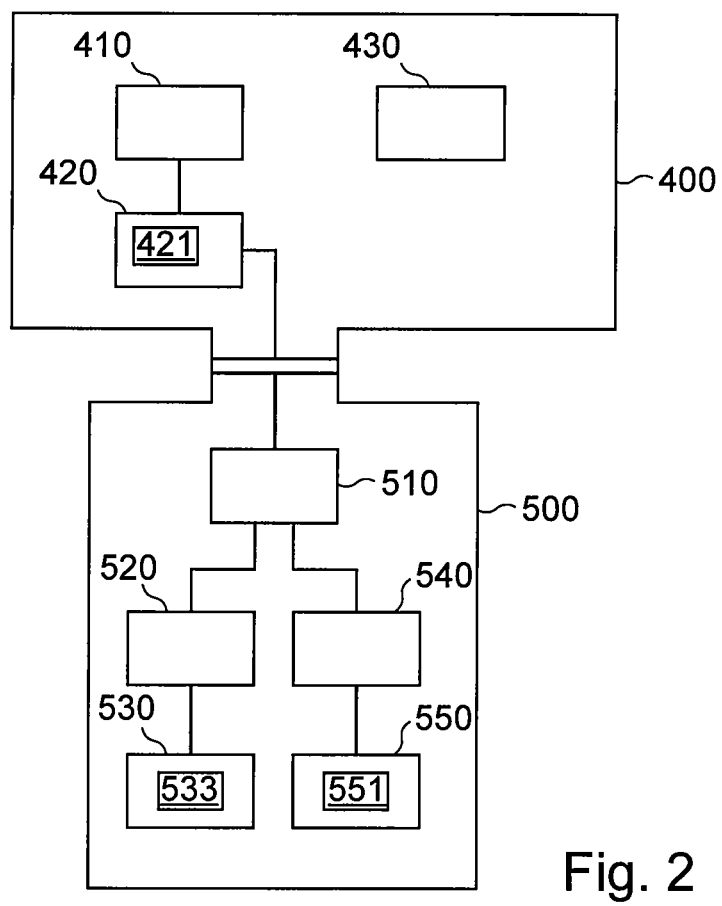
FIG. 2 is a view of one embodiment of a host station according to the invention, to which a portable electronic entity is connected.

Referring to FIG. 2, the customs (or police) computer 400 includes a processor 410 and a memory 420. An identity check application 421 that can be executed on the computer 400 is stored in the memory 420 (or on a medium such as a hard disk).

An electronic passport 500 includes a hub 510 to which are connected a microcircuit card reader 540 containing a microcircuit card 550 and a flash memory controller 520 itself connected to a flash memory 530.

All these components 520, 530, 540, 550 come from the same manufacturer, whose identifier is VID. Alternatively, they can come from different manufacturers.

This manufacturer has given the product identifier PID5 to the flash memory controllers and the product identifier PID6 to the microcircuit cards.

The identifier of the flash memory controller 520 is therefore VID/PID6/SN, SN being the serial number of the flash memory controller 520.

The microcircuit card 550 was personalized after assigning the serial number to the flash memory controller 520 and has the same serial number as the flash memory controller 520. Its identifier is VID/PID6/SN.

The card 550 contains identity information 551 in text form for the bearer of the passport (name, forename, date of birth).

The flash memory 530 contains a photograph 533 of the bearer of the passport, in a portion of the memory 530 that is write-protected or not modifiable by the bearer.

A first falsification that can be envisaged is to move the flash memory 530 from a first key to a second key whose microcircuit card contains different identity information in text form.

A second falsification that can be envisaged consists in moving the microcircuit card 550 from a first key to a second key whose flash memory contains a different photograph.

On passing through customs, or in the event of an identity check, an operator connects the passport key 500 to the computer 400.

The identity check application 421 is then executed by the central unit 410.

As execution of this embodiment continues, communication between the host station 400 and the key 500 is made secure by the use of the cryptographic means available in the microcircuit card 550 to encrypt and sign the information transferred from one entity to the other, in particular the identifiers.

In a first step, the application 421 searches the microcircuit cards for electronic components having the product identifier PID6. It finds the card 550. It authenticates the microcircuit card 550 with the aid of its cryptographic means.

The application 421 then searches the flash memory controllers for electronic components having the product identifier PID5. It finds the memory controller 520.

The application 421 also authenticates the memory controller 520 with the aid of the cryptographic means of the microcircuit card 550.

In a second step, the application 421 reads the serial number of the electronic components identified during the first step, i.e. the memory controller 520 and the microcircuit card 550.

If they are different then the key has been falsified, and the application 421 informs the operator of this, usually the customs officer.

If they are identical, the application 421 then loads the photograph 563 into the memory 420 of the computer and displays the photograph 563 on the screen of the computer 400.

The customs officer compares the photo 563 with the appearance of the bearer and reads on the screen the text information on the identity of the bearer contained in the microcircuit card 550.

Verifying the connection between the serial numbers (here their identity) ensures that the information in the flash memory 530 and the information in the microcircuit card 550 are well matched (i.e. functionally complementary to each other) and that the identity verification that uses the two sources of information can be carried out correctly.

The present invention is not limited to the embodiment described hereinabove and represented in the drawing. It also concerns all variants evident to the person skilled in the art.

The person skilled in the art can adapt the embodiments described as a function of their general knowledge. In particular, they can use other types of components (member of a class of USB electronic components or not) and other applications. The interface and the communication means can conform to the ISO 7816 standard, the ISO 14443 standard or any other standard or specification.

The invention can also be implemented by comparing the concatenation of a product description string and a serial number of the identifiers conforming to the USB standard of the two electronic components.

The person skilled in the art can also adapt the invention by using it in a situation in which the identifier is in a rewritable memory area. They also know how to adapt it to a situation in which the vendor identifiers of the various electronic components are not equal.

The invention claimed is:

1. A host station including:
    a microprocessor programmed with software code, recorded on a non-transitory storage medium, that causes the microprocessor to:
    communicate with a first electronic component, said first electronic component having a first identifier, said first identifier conforming to a predetermined convention, identifiers according to said convention comprising a common part that is common to electronic components of a same family, and a unique part specific to each instance of an electronic component in the same family; and
    communicate with at least one second electronic component, said second electronic component having a second identifier, said second identifier conforming to said convention, and the common part of said second identifier being different from the common part of said first identifier,
    wherein said first and second components are comprised within a same electronic entity different from the host station,
    wherein the host station further comprises software code that causes the microprocessor to:
    execute a verification of matching in accordance with a predetermined rule of the unique part of said first identifier with the unique part of said second identifier, and
    wherein said verification of matching is performed by at least one of:
    checking that one of said first electronic component has not been illegitimately replaced by another within said same electronic entity; and
    recognizing that said first and second electronic components are complementary.

2. The host station according to claim 1, wherein a unique part according to said convention comprises a serial number conforming to a Universal Serial Bus standard.

3. The host station according to claim 2, wherein said part comprises a concatenation of a product description string and a serial number both conforming to the Universal Serial Bus standard.

4. The host station according to claim 1, wherein matching in accordance with said predetermined rule is achieved if a predetermined arithmetic equality between a portion of said unique part of the first identifier and a same portion of said unique part of said second identifier is achieved.

5. The host station according to claim 4, wherein said arithmetic equality is identity.

6. The host station according to claim 1, wherein said verification means comprise a verification application adapted to determine said first identifier.

7. The host station according to claim 6, wherein said verification application is adapted to compare:
    an identifier assigned to a logical volume corresponding to said first electronic component,
    with each identifier assigned to the logical volumes corresponding to the electronic components communicating with said host station via communication means conforming to a predetermined standard,
    so as to determine said first identifier.

8. The host station according to claim 7, further comprises:
    said identifier reassigned to a logical volume corresponding to said first electronic component is obtained using a Windows™ API command GetVolumeNameForVolumeMountPoint, and
    each identifier assigned to the logical volumes corresponding to the electronic components communicating with said host station via communication means conforming to a predetermined standard is achieved using at least the Windows™ API commands SetupDiEnumDeviceInfo and GetVolumeNameForVolumeMountPoint.

9. The host station according to claim 1, wherein further comprising:
    software code that causes the microprocessor to execute a dependent application and submit execution of at least a part of said dependent application to said verification of said matching.

10. The host station according to claim 9, wherein said dependent application is adapted to use a first function of said first component and a second function of said second component.

11. The host station according to claim 9, wherein said dependent application comprises an identity verification program, a function of the first component comprising making available to said application a first set of biometric or personal data and a function of the second component comprising making available to said application a second set of biometric or personal data.

12. The host station according to a claim 1, wherein a operating system of said host station is a version of Windows™.

13. The host station according to claim 1, further comprising:
    software code that causes the microprocessor to execute effecting a search of a plurality of electronic components each having an identifier conforming to said convention and the common part whereof is different from the common part of said first identifier for an electronic component the unique part of the identifier whereof is matched with the unique part of said first identifier.

14. A portable electronic entity, comprising:
    a first electronic component having a first identifier, said first identifier conforming to a predetermined convention, identifiers according to said convention comprising a common part that is common to electronic components of a same family, and a unique part specific to each instance of an electronic component in the same family;
    at least one second electronic component having a second identifier, said second identifier conforming to said convention, and the common part of said second identifier being different from the common part of said first identifier;

a communication interface that communicates with a host station different from the portable electronic entity;

a verification unit that effects a verification of matching in accordance with a predetermined rule of the unique part of said first identifier with the unique part of said second identifier, wherein said verification of matching is performed by at least one of:

checking that one of said first and second electronic component has not been illegitimately replaced by another within said same electronic entity; and recognizing that said first and second electronic components are complementary.

15. The portable electronic entity according to claim 14, wherein a unique part in accordance with said convention comprises a serial number conforming to a Universal Serial Bus standard.

16. The portable electronic entity according to claim 14, wherein matching in accordance with said predetermined rule is achieved if a predetermined arithmetic equality between a portion of said unique part of the first identifier and a same portion of said unique part of said second identifier is achieved.

17. The portable electronic entity according to claim 16, wherein said arithmetic equality is identity.

18. The portable electronic entity according to claim 14, wherein said communication interface conforms to a Universal Serial Bus standard.

19. The portable electronic entity according to claim 14, wherein the first electronic component is a combination comprising a memory controller and a flash memory attached to said memory controller.

20. The portable electronic entity according to claim 14, wherein said communication interface comprise a microcircuit card reader.

21. The portable electronic entity according to claim 20, wherein a microcircuit card is inserted into said microcircuit card reader, and wherein said microcircuit card is personalized with said second identifier.

22. The portable electronic entity according to claim 21, wherein said second identifier is stored in a file written into a memory area of said microcircuit card.

23. The portable electronic entity according to claim 14, wherein said verification unit comprise a verification application adapted to be executed by the host station.

24. The portable electronic entity according to claim 23, wherein said verification application is launched automatically after connection of the portable electronic entity to the host station.

25. The portable electronic entity according to claim 23, wherein said first electronic component comprising a memory storing instructions of said verification application, said verification application is adapted to determine said first identifier.

26. The portable electronic entity according to claim 25, wherein said verification application is adapted to compare:
an identifier assigned to a logical volume corresponding to a peripheral storing said application,
with each identifier assigned to the logical volumes corresponding to the electronic components communicating with said host station via communication means conforming to a predetermined standard,
so as to determine said first identifier.

27. The portable electronic entity according to claim 22, wherein
said identifier assigned to a logical volume corresponding to a peripheral storing said application is obtained using a Windows™ API command GetVolumeNameForVolumeMountPoint, and
each identifier assigned to the logical volumes corresponding to the electronic components communicating with said host station via communication means conforming to a predetermined standard is obtained using at least the Windows™ API commands SetupDiEnumDeviceInfo and GetVolumeNameForVolumeMountPoint.

28. The portable electronic according to claim 14, further comprising:
a memory storing instructions of a dependent application adapted to be at least partly loaded into a host station and instructions for submitting execution of at least a part of said dependent application to said verification of said matching.

29. The portable electronic entity according to claim 28, wherein said first electronic component comprises said memory storing instructions of said dependent application.

30. The portable electronic entity according to claim 14, wherein said dependent application is adapted to use a first function of said first component and a second function of said second component.

31. The portable electronic entity according to claim 28, wherein said dependent application comprises a network browser and wherein a function of said first component comprises making personal data available to said application and a function of said second component comprises making a cryptographic key available to said application.

32. The portable electronic entity according to claim 31, wherein said network browser authorizes access to only predetermined Internet addresses.

33. The portable electronic entity according to claim 14, further comprising:
a searching unit that effects a search among a plurality of electronic components each having an identifier conforming to said convention and the common part whereof is different from that of said first identifier for an electronic component the unique part of the identifier whereof is matched with the unique part of said first identifier.

34. A method of verification in a host station with which a first electronic component having a first identifier and a second electronic component having a second identifier communicate, said first and second components being comprised within a same electronic entity different from the host station, the method comprising the step of:
verification of matching, via a programmed microprocessor, in accordance with a predetermined rule of a unique part of said first identifier with a unique part of said second identifier,
said first identifier conforming to a predetermined convention, within which identifiers according to said predetermined convention comprise a common part that is common to electronic components of a same family, and a unique part specific to each instance of an electronic component in the same family, and
said second identifier conforming to said predetermined convention, a common part of said second identifier being different from a common part of said first identifier, wherein said verification of matching is performed by at least one of:
checking that one of said first and second electronic component has not been illegitimately replaced by another within said same electronic entity; and
recognizing that said first and second electronic components are complementary.

35. The method according to claim 34, wherein a unique part according to said convention comprises a serial number conforming to a Universal Serial Bus standard.

36. The method according to claim 34, wherein matching in accordance with said predetermined rule is achieved if a predetermined arithmetic equality is achieved between a portion of the unique part of said first identifier and a same portion of the unique part of said second identifier.

37. The method according to claim 34, further comprising:
a step of searching among a plurality of electronic components communicating with said host station and each having an identifier conforming to said predetermined convention and the common part whereof is different from the common part of said first identifier for an electronic component the unique part of the identifier whereof is matched with the unique part of said first identifier.

38. The method according to claim 34, further comprising:
a step of comparison:
of an identifier assigned by an operating system of said host station to a logical volume corresponding to said first electronic component,
with each identifier assigned by said operating system to a logical volume corresponding to a physical peripheral communicating with said host station on which said application is executed by communication means conforming to a Universal Serial Bus standard,
so as to determine said first identifier.

39. The method according to claim 38, further comprising:
a step of obtaining the identifier assigned to a logical volume corresponding to the peripheral storing said application using a Windows™ API command GetVolumeNameForVolumeMountPoint; and
a step of obtaining each identifier assigned to the logical volumes corresponding to the electronic components communicating with said host station via communication means conforming to a predetermined standard using at least the Windows™ API commands SetupDiEnumDeviceInfo and GetVolumeNameForVolumeMountPoint.

40. The method according to claim 34, further comprising:
a step of reading an identifier of a microcircuit card contained in an electronic component, said identifier being written into a file in a memory of said microcircuit card.

41. The method according to claim 40,
wherein said microcircuit card is included in the second electronic component and
further comprising a preliminary step of electronic personalization of said microcircuit card during which an identifier including a serial number corresponding to the serial number of a memory controller included in the first electronic component is written into a memory of said microcircuit card.

42. The method according to claim 34, further comprising:
a step of execution of a dependent application, at least a part of said execution being subject to said verification of said matching.

43. The method according to claim 34, wherein said first electronic component and said second electronic component are physically distinct components.

44. The method according to claim 34, further comprising a step of determination of the identifier of said first electronic component.

45. A non-transitory computer readable storage medium with a computer program stored thereon comprising a series of instructions adapted to, upon execution by a microprocessor of a host station device, cause said host station device to perform a method of verification in said host station device with which a first electronic component having a first identifier and a second electronic component having a second identifier communicate, said first and second components being comprised within a same electronic entity different from the host station,
the method comprises the following step of:
verification of matching in accordance with a predetermined rule of a unique part of said first identifier with a unique part of said second identifier,
said first identifier conforming to a predetermined convention, within which identifiers according to said predetermined convention comprise a common part that is common to electronic components of a same family, and a unique part specific to each instance of an electronic component in the same family, and
said second identifier conforming to said predetermined convention, a common part of said second identifier being different from a common part of said first identifier,
wherein said verification of matching is performed by at least one of:
checking that one of said first and second electronic component has not been illegitimately replaced by another within said same electronic entity; and
recognizing that said first and second electronic components are complementary.

* * * * *